United States Patent
Matsuda (10) Patent No.: US 7,715,791 B2
(45) Date of Patent: May 11, 2010

(54) BLUETOOTH COMMUNICATOR, SHORT RANGE WIRELESS COMMUNICATOR AND PROGRAM

(75) Inventor: Naoki Matsuda, Anjo (JP)

(73) Assignee: DENSO CORPORATION, Kariya (JP)

( * ) Notice: Subject to any disclaimer, the term of this patent is extended or adjusted under 35 U.S.C. 154(b) by 1245 days.

(21) Appl. No.: 11/248,252

(22) Filed: Oct. 13, 2005

(65) Prior Publication Data

US 2006/0079182 A1 Apr. 13, 2006

(30) Foreign Application Priority Data

Oct. 21, 2004 (JP) .............................. 2004-306782
Aug. 18, 2005 (JP) .............................. 2005-237652

(51) Int. Cl.
*H04B 7/00* (2006.01)
(52) U.S. Cl. ................. 455/41.2; 455/414.3; 455/432.3
(58) Field of Classification Search ................ 455/41.2, 455/41.3, 414.3, 432.3
See application file for complete search history.

(56) References Cited

U.S. PATENT DOCUMENTS

| | | | | |
|---|---|---|---|---|
| 7,327,981 | B2 * | 2/2008 | Hundal | 455/41.2 |
| 7,356,001 | B1 * | 4/2008 | Jones et al. | 370/331 |
| 2005/0070336 | A1 * | 3/2005 | Tamura | 455/567 |

FOREIGN PATENT DOCUMENTS

| | | |
|---|---|---|
| JP | A-2002-074153 | 3/2002 |
| JP | A-2002-290416 | 10/2002 |
| JP | A-2002-359873 | 12/2002 |
| JP | A-2003-092643 | 3/2003 |
| JP | A-2006-109292 | 4/2006 |

OTHER PUBLICATIONS

Office Action dated Apr. 4, 2008 in corresponding Chinese Patent Application No. 200510116401.4 (and English translation).
Office Action mailed Nov. 17, 2009 in corresponding Japanese Patent Application No. 2005-237652 (and English translation).

* cited by examiner

*Primary Examiner*—Nay A Maung
*Assistant Examiner*—Tuan H Nguyen
(74) *Attorney, Agent, or Firm*—Posz Law Group, PLC

(57) ABSTRACT

While a handsfree device being multi-profile compatible is maintaining a connection for a handsfree profile (HFP) with a mobile phone handset, the handsfree device cuts off the connection for the HFP based on a user's operation. After cutting off, the handsfree device establishes a connection for a dial-up network profile (DUN), and subsequently transmits a request for a connection for the HFP while maintaining the connection for the DUN. Subsequently, the handsfree device determines whether the handset is multi-profile compatible according to the response to the request from the handset. Based on the determination that the handset is multi-profile compatible, the handsfree device executes the processes for the HFP while maintaining the connection for the DUN.

11 Claims, 6 Drawing Sheets

BLUETOOTH COMMUNICATOR, SHORT RANGE WIRELESS COMMUNICATOR AND PROGRAM

CROSS REFERENCE TO RELATED APPLICATION

This application is based on and incorporates herein by reference Japanese Patent Applications No. 2004-306782 filed on Oct. 21, 2004 and No. 2005-237652 filed on Aug. 18, 2005.

FIELD OF THE INVENTION

The present invention relates to a multi-function compatible short-range wireless communicator which is capable of providing a plurality of connections at a time. Moreover, the present invention relates to a multi-profile compatible Bluetooth communicator which is capable of providing connections for a plurality of profiles at a time. For example, they are applicable for a Bluetooth communicator for a vehicle.

BACKGROUND OF THE INVENTION

Conventionally, a Bluetooth communicator providing wireless communications according to the specifications of the Bluetooth is used widely. The specifications of the Bluetooth include different profiles, each of which defines functions necessary for a mode of the operation of the Bluetooth communicator. A handsfree profile (HFP) for providing a handsfree function and a dial-up network profile (DUN) for providing data communications through a dial-up connection on a telephone line are examples of the profiles.

Figure 7:
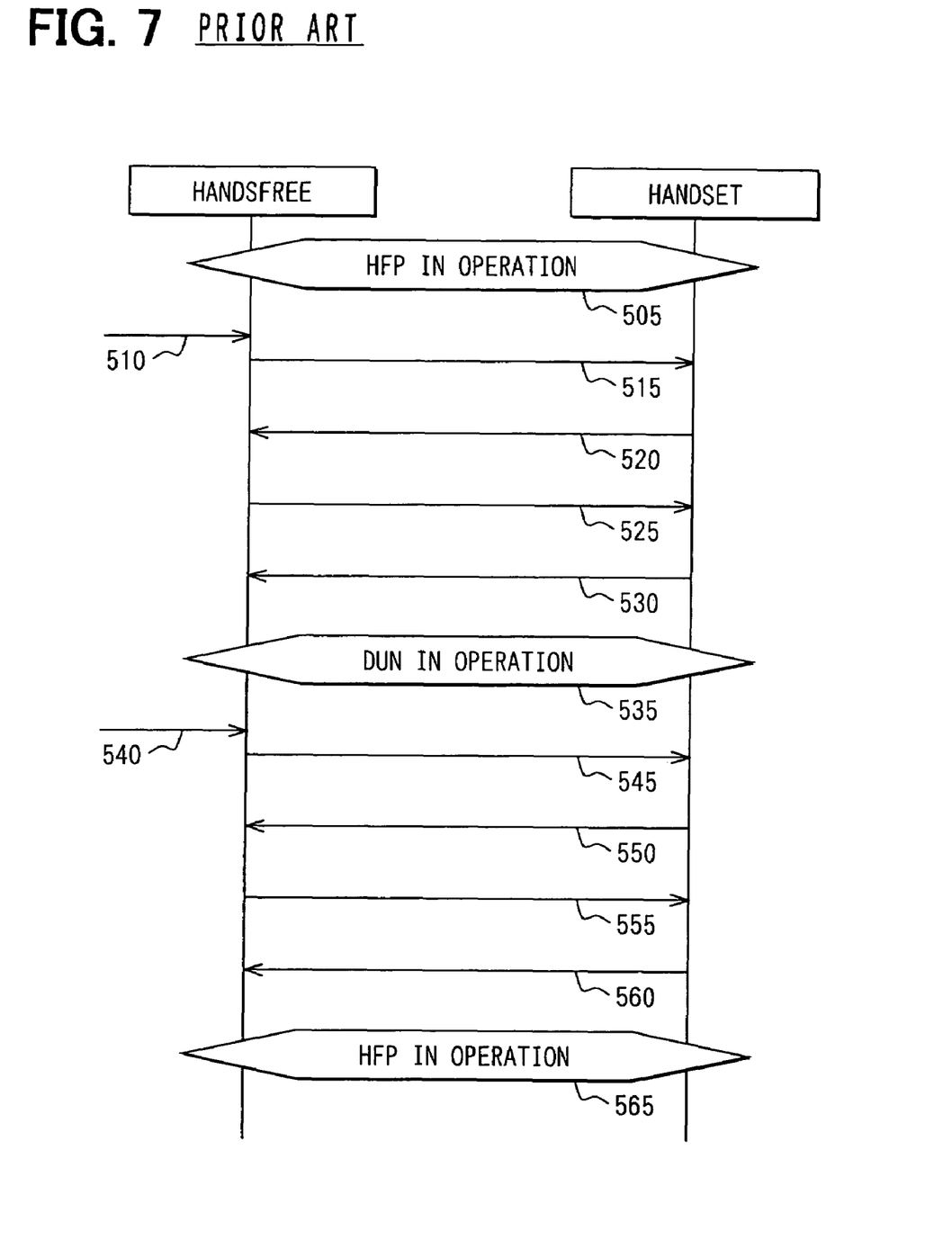
FIG. 7 is a sequence chart illustrating a procedure of communications between a conventional multi-profile incompatible handsfree device and a multi-profile incompatible mobile phone handset.

FIG. 7 is a sequence chart which illustrates an exemplary procedure of communications for establishing a connection of the Bluetooth between a handsfree device and a mobile phone handset and for providing the functions of the handsfree profile and the dial-up network profile.

In the figure, the handsfree device and the handset is maintaining a connection for the handsfree profile with each other (State 505). Then, a user's operation 510 to the handsfree device for starting data communications causes the handsfree device to transmit, to the handset, an HFP disconnection request signal 515 for requesting for cutting off the connection for the handsfree profile. In response to the signal 515, the handset returns, to the handsfree device, an HFP disconnection response signal 520 including a message of "OK." Then, the handsfree device and the handset terminate processes for the handsfree profile.

Next, the handsfree device transmits a DUN connection request signal 525 to the handset in order to establish a connection for the dial-up network profile. In response to the signal 525, the handset returns a DUN connection response signal 530 including a message of "OK" to the handsfree device. Then the wireless communications for the dial-up network profile are established and thus the handsfree device opens a connection with a wide-area network such as the Internet by using the phone calling function of the handset, and executes data communications such as Web browsing through the wide-area network (State 535).

When the data communications end due to an operation 540 of the user, the handsfree device transmits, to the handset, a DUN disconnection request signal 545 for requesting for cutting off the connection for the dial-up network profile. In response to the signal 545, the handset returns a DUN disconnection response signal 550 including a message of "OK" to the handsfree device. Then, the handsfree device and the handset terminate processes for the dial-up network profile.

Next, the handsfree device transmits an HFP connection request signal 555 to the handset in order to establish a connection for the handsfree profile. In response to the signal 555, the handset returns an HFP connection response signal 560 including a message of "OK" to the handsfree device. Then the communications for the handsfree profile is established and thus the handsfree device becomes capable of receiving and sending a phone call by using the phone calling function of the handset (State 565).

Although the handset in the above example provides both the handsfree profile function and the dial-up profile function, it does not provide both the functions at a time. In other words, the handset stops one of the handsfree profile function and the dial-up profile function while it is providing the other profile function.

However, multi-profile compatible Bluetooth communicators have become available in recent years. The multi-profile compatible Bluetooth communicator is capable of providing functions for a plurality of profiles at a time. By using the multi-profile compatibility of both the handsfree device and the mobile phone handset, both the handsfree profile function and the dial-up network profile function can be provided at a time in the connection between the handsfree device and the handset. In this case, the handset can mediate the dial-up connection of the handsfree device and transmit a notification of an incoming phone call to the handsfree device, at the same time.

However, a multi-profile compatible Bluetooth communicator does not always connect with a comparable multi-profile compatible Bluetooth communicator. There may be a case where a multi-profile compatible Bluetooth communicator starts to communicate with a certain Bluetooth communicator having no multi-profile compatibility by supposing that the certain Bluetooth communicator should have multi-profile compatibility. In this case, problems may arise in establishing a connection between the two Bluetooth communicators.

SUMMARY OF THE INVENTION

The present invention addresses the above point. Thus, it is the first objective of the present invention to provide a Bluetooth communicator, which communicates with a multi-profile compatible Bluetooth communicator utilizing their multi-profile compatibility and communicates with a multi-profile incompatible Bluetooth communicator with fewer problems.

The above problems possibly arise not only for the multi-profile compatible Bluetooth communicators, but also for a multi-function compatible short distance wireless communicator which can provide plurality of functions in its communications with another multi-function compatible short distance wireless communicator.

In view of this, it is the second objective of the present invention to provide a multi-function compatible short-range wireless communicator, which communicates with another multi-function compatible short-range wireless communicator with utilizing their multi-function compatibility and communicates with a multi-function incompatible short-range wireless communicator without problem.

A Bluetooth communicator for achieving the first objective of the present invention transmits a request to another Bluetooth communicator, while maintaining a connection for a first profile with the another Bluetooth communicator, the request being for a connection for a second profile different from the first profile. Then the Bluetooth communicator determines whether the another Bluetooth communicator is multi-profile compatible, according to a response to the request from the another Bluetooth communicator. Then the Bluetooth communicator executes a process for providing a function for the second profile while maintaining the connection for the first profile, based on the determination that the another Bluetooth communicator is multi-profile compatible.

According to the specifications of the Bluetooth, if the another Bluetooth communicator is multi-profile compatible, it returns, in response to the request from the Bluetooth communicator of the present invention, a signal indicating that it is possible to establish a connection for the second profile. On the other hand, if the another Bluetooth communicator is multi-profile compatible, it returns, in response to the request, a signal indicating that it is impossible to establish a connection for the second profile.

Therefore, the Bluetooth communicator of the present invention in the above two aspects establishes connections with the another Bluetooth communicator by utilizing the multi-profile compatibility selectively when the another Bluetooth communicator is multi-profile compatible. In addition, the Bluetooth communicator of the present invention communicates with a multi-profile incompatible Bluetooth communicator with fewer problems, because the Bluetooth communicator of the present invention does not utilize the multi-profile compatibility in some cases when the another Bluetooth communicator is multi-profile incompatible.

In another aspect of the present invention for achieving the first objective, a Bluetooth communicator transmits a request to another Bluetooth communicator, while maintaining a connection for a given profile other than a handsfree profile with the another Bluetooth communicator, the request being for a connection for the handsfree profile. Then the Bluetooth communicator executes a process for an incoming phone call while maintaining the connection for the given profile on receiving a notification of an incoming phone call according to the handsfree profile after the transmission of the request.

If the another Bluetooth communicator is multi-profile compatible, it provides the given profile and the handsfree profile at a time. Therefore the another Bluetooth communicator sends a notification of an incoming phone call to the Bluetooth communicator of the present invention, even when the connection for the given profile is maintained between the Bluetooth communicators.

Therefore, the Bluetooth communicator of the present invention in the above two aspects establishes connections with the another Bluetooth communicator by utilizing the multi-profile compatibility when the another Bluetooth communicator is multi-profile compatible.

A short-range wireless communicator for achieving the second objective of the present invention transmits a request to another short-range wireless communicator, while maintaining a connection for a first function with the another short-range wireless communicator, the request being for a connection for a second function different from the first function. Then the short-range wireless communicator determines whether the another short-range wireless communicator is multi-function compatible, according to a response to the request from the another short-range wireless communicator. Then the short-range wireless communicator executes a process for providing the second function while maintaining the connection for the first function, based on the determination that the another short-range wireless communicator is multi-function compatible.

Therefore, the short-range wireless communicator of the present invention in the above two aspects establishes connections with the another short-range wireless communicator by utilizing the multi-function compatibility selectively when the another short-range wireless communicator is multi-function compatible. In addition, the short-range wireless communicator of the present invention communicates with a multi-function incompatible short-range wireless communicator with fewer problems, because the short-range wireless communicator of the present invention does not utilize the multi-function compatibility in some cases when the another short-range wireless communicator is multi-function incompatible.

In another aspect of the present invention for achieving the first objective, a short-range wireless communicator transmits a request to another short-range wireless communicator, while maintaining a connection for a given function other than a handsfree function with the another short-range wireless communicator, the request being for a connection for the handsfree function. Then the short-range wireless communicator executes a process for an incoming phone call while maintaining the connection for the given function on receiving a notification of an incoming phone call according to the handsfree function after the transmission of the request.

Therefore, the short-range wireless communicator of the present invention in the above two aspects establishes connections with the another short-range wireless communicator by utilizing the multi-function compatibility when the another short-range wireless communicator is multi-function compatible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE INVENTION

First Embodiment

Figure 1:
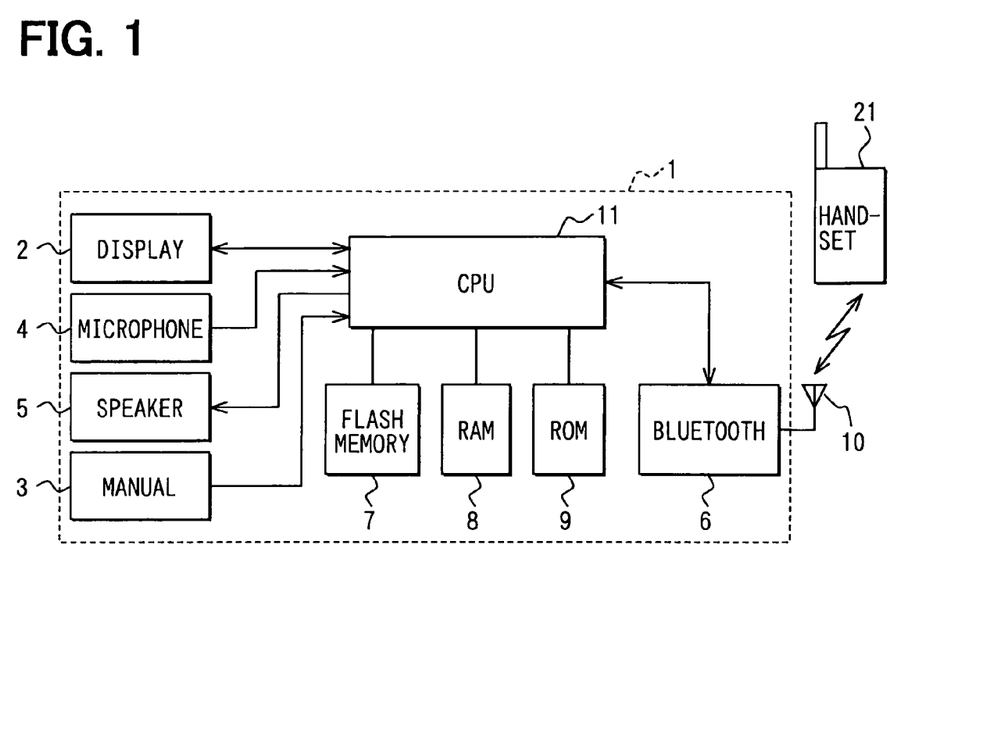
FIG. 1 is a schematic structural block diagram of a handsfree device for a vehicle of a first embodiment of the present invention.

As shown in FIG. 1, a handsfree device 1 installed in a vehicle of a first embodiment includes a display 2, a manual operating device 3, a microphone 4, a speaker 5, a Bluetooth device 6, a flash memory 7, a RAM 8, a ROM 9, an antenna 10, and a CPU 11.

The display 2 displays data from the CPU 11 such as character data and image data. The display 2 is, for example, a liquid crystal display.

The manual operating device 3 includes mechanical switches which is be operable by a user and outputs signal to the CPU 11 depending on the user's operation to the switches.

The microphone 4 converts a voice of the user to a voice signal and outputs the voice signal to the CPU 11.

The speaker 5 outputs a voice according to a voice signal output from the CPU 11.

The Bluetooth device 6 is a wireless communications circuit, which executes predetermined processes such as frequency conversion, demodulation, amplification, and A/D conversion to a signal received from the antenna 10, according to the specifications of the Bluetooth. Subsequently, Bluetooth device 6 outputs the resultant data of the processes to the CPU 11. In addition, the Bluetooth device 6 executes predetermined processes such as D/A conversion, amplification, modulation, and frequency conversion to data from the CPU 11, according to the specifications of the Bluetooth. Subsequently, the Bluetooth device 6 outputs the resultant signal of the processes to the antenna 10. The Bluetooth device 6 is designed to communicate with various mobile phone handsets 21 by using the Bluetooth (or Bluetooth communications).

The flash memory 7 is a rewritable nonvolatile storage medium and stores an address-book dataset which specifies correspondences between a telephone number and a label such as a name of an owner of the telephone number. The flash memory 7 may be replaced with a volatile storage medium which keeps storing data continuously by receiving a power supply from a backup power source.

The CPU 11 reads and executes programs for its operation. In executing the programs, the CPU 11 writes data to the flash memory 7 and the RAM 8, and reads data from the flash memory 7, the RAM 8, and the ROM 9. In the operation, the CPU 11 receives signals from the manual operating device 3, the microphone 4, and the Bluetooth device 6, and outputs signals to the speaker 5 and the Bluetooth device 6.

The handset 21 for communicating with the handsfree device 1 has a function for communicating with the Bluetooth device 6 according to the specifications of the Bluetooth, as well as a function for normal telephone communications. Here, the handset 21 has a function for a handsfree profile and a dial-up network profile defined by the specifications of the Bluetooth.

The handset 21 may be a multi-profile compatible handset or a multi-profile incompatible handset. The multi-profile compatible handset can execute operations for a plurality of profiles such as a handsfree profile and a dial-up network profile at a time. The multi-profile incompatible handset can execute an operation only for a single profile at a time.

Specifically, while the multi-profile compatible handset is executing an operation for a profile, it returns a response including a message of "OK" on receiving a connection request requesting a connection for another profile from a Bluetooth communicator. The response including the message of "OK" indicates permission of the connection. In this case, the multi-profile compatible handset provides an operation for the requested profile as well as the preceding profile.

For example, a mobile phone handset with a name F900iT manufactured by NTTDoCoMo and a handset with a name Vodafone 6650 manufactured by NOKIA are the multi-profile compatible handsets.

While the multi-profile incompatible handset is executing an operation for a profile, it returns a response including a message of "NG" on receiving the connection request requesting the connection for another profile from the Bluetooth communicator. The response including the message of "NG" indicates denial of the connection.

Hereafter, the operation of the CPU 11 is described. When the handset 21 enters an area in which it can communicate with the handsfree device 1 by the Bluetooth, the CPU 11 executes processes for establishing a connection of the Bluetooth with the handset 21 and provides a function for the handsfree profile.

Figure 2:
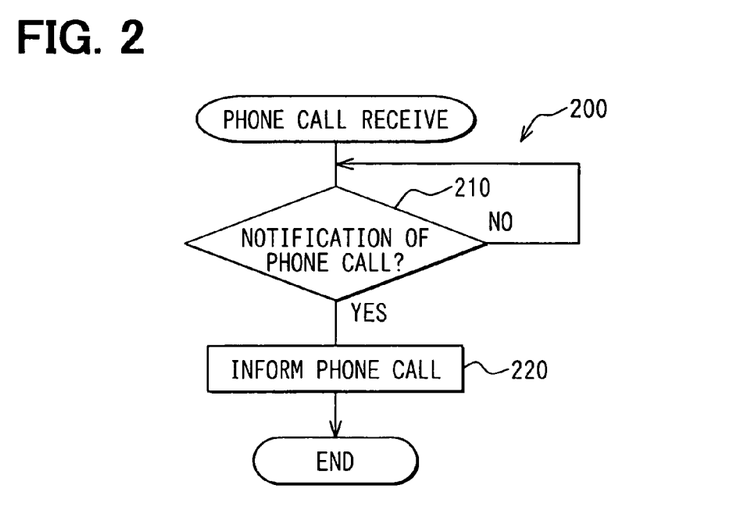
FIG. 2 is a flowchart explaining a phone call notification receiving program of the first embodiment.

A phone call notification receiving program 200 illustrated in FIG. 2 is one of the processes for the handsfree profile. In executing the program 200, the CPU 11 initially determines at Step 210 whether it receives, through the antenna 10 and the Bluetooth device 6, a notification of an incoming phone call at the handset 21. The CPU 11 executes the determination repeatedly until the determination becomes affirmative.

When the determination is affirmative, the CPU 11 causes at Step 220 the display 2 or the speaker 5 to inform the user of the incoming phone call. The display 2 informs the user of the incoming phone call by displaying, for example, information such as a telephone number which is included in the received notification and a name which corresponds to the telephone number according to the address-book dataset in the flash memory 7. The speaker 5 informs the user of the incoming phone call by outputting, for example, a ring-tone sound.

In addition to the program 200, after informing the incoming phone call, the CPU 11 executes a process for the handsfree profile in which it transmits a notification of initiating a telephone conversation regarding the phone call through the Bluetooth device 6 to the handset 21. This process is triggered by the user's operation of an off-hook to the manual operating device 3. Then the handset 21 receives the notification, opens a line for the telephone conversation, and notifies the handsfree device 1 of the opening of the line. Then, the CPU 11 receives the notification of the opening and provides the function for the telephone conversation.

Additionally, the CPU 11 executes a process for the handsfree profile in which it requests, through the Bluetooth device 6, the handset 21 to make a phone call to a remote telephone terminal. This is triggered when the manual operating device 3 receives a user's operation for making the phone call to the telephone terminal and then notifies it to the CPU 11. The handset 21 makes the phone call according to the request. When a phone line regarding the requested phone call to the remote telephone terminal is opened, the handset 21 notifies the handsfree device 1 of the opening of the phone line. The CPU 11 receives the notification through the Bluetooth device 6 and provides the function for the telephone conversation with the telephone terminal over the phone line.

The function for the telephone conversation to be provided is as follows. When the handset 21 receives a voice signal from the telephone terminal, it transmits the received voice signal wirelessly to the handsfree device 1. The CPU 11 receives and the voice signal and outputs the signal to the speaker 5. Then the speaker 5 outputs a voice according to the voice signal. In addition, the CPU 11 receives a voice signal of the user in the vehicle through the microphone 4 and transmits the voice signal wirelessly to the handset 21. When the handset 21 receives the voice signal for transmission, it transmits the voice signal to the remote telephone terminal. The function for the telephone conversation is thus provided by the handsfree device 1 and the handset 21.

Figure 3:
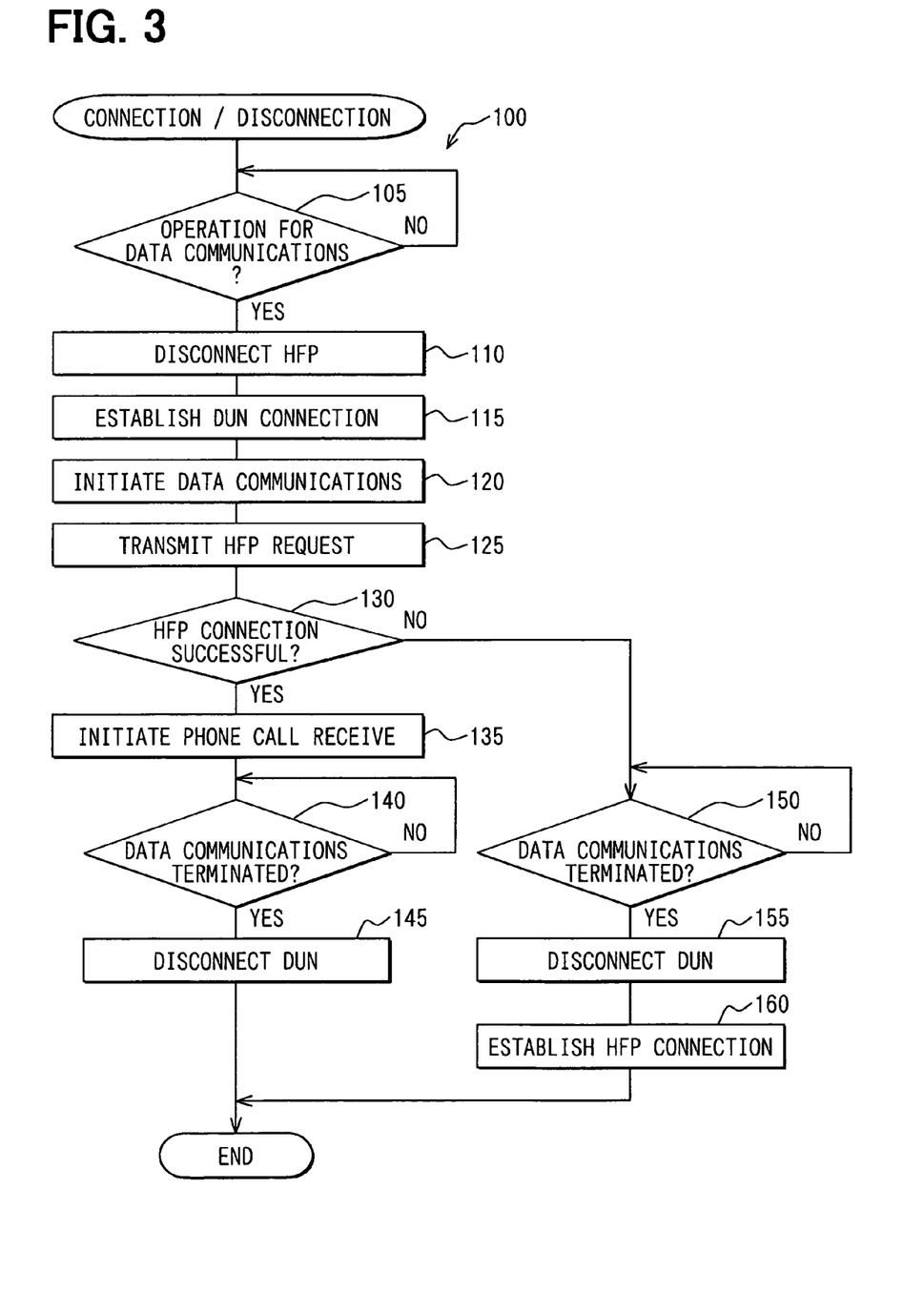
FIG. 3 is a flowchart explaining a connection/disconnection program of the first embodiment.

The CPU 11 executes the connection/disconnection program 100 illustrated in FIG. 3 repeatedly while it is executing the processes for the handsfree profile. The program 100 is for determining whether or not the handset 21 is multi-profile compatible. Moreover, the program 100 is for initiating and terminating processes for the handsfree profile and the dial-up network profile and establishing and cutting a connection, according to the determination.

In executing the program 100, the CPU 11 initially determines at Step 105 whether the manual operating device 3 receives a user's operation for initiating data communications. The CPU 11 executes the determination repeatedly until the determination becomes affirmative.

When the determination is affirmative, the CPU 11 subsequently executes at Step 110 a process for cutting off the connection for the handsfree profile (HFP in FIG. 3). Specifically, the CPU 11 transmits, by using the Bluetooth device 6, an HFP disconnection request signal requesting for cutting off the connection for the handsfree profile. Additionally, the CPU 11 terminates the processes for the handsfree profile such as the process of the program 200, when it receives, through the Bluetooth device 6, an HFP disconnection response signal including a message of "OK" which is transmitted in response to the HFP disconnection request signal.

Subsequently at Step 115, the CPU 11 establishes a connection for the dial-up network profile (DUN in FIG. 3). Specifically, the CPU 11 transmits, by using the Bluetooth device 6, a DUN connection request signal requesting for a connection for the dial-up network profile. Additionally, the CPU 11 waits for a DUN connection response signal including a message of "OK" which is transmitted in response to the DUN connection request signal.

When the CPU 11 receives the DUN connection response signal including a message of "OK," it subsequently initiates at Step 120 a process for the data communications. In other words, the CPU 11 starts executing a program in the ROM 9 for the data communications in parallel with the execution of the program 100. In executing the program for the data communications, the CPU 11 transmits, through the Bluetooth device 6 to the handset 21, a signal (e.g., an ATD command in the AT commands group) requesting for making a telephone call to a predetermined access point. Then the CPU 11 joins a wide-area network such as the Internet over a connection to the access point. Moreover, the CPU 11 exchanges data with communications devices in the wide-area network, and stores the data received by the exchange in the flash memory 7 or causes the display 2 to display the received data. The exchange of the data is made by, for example, requesting and receiving Web pages according to the http protocol.

After the initiation of the program for the data communications, the CPU 11 transmits, by using the Bluetooth device 6, at Step 125 a HFP connection request signal requesting for a connection for the handsfree profile, while maintaining the connection for the dial-up network profile established at Step 115. As described above, if the handset 21 is multi-profile compatible, the handset 21 transmits an HFP connection response signal including the message of "OK." If the handset 21 is multi-profile incompatible, the handset 21 transmits an HFP connection response signal including a message of "NG."

Subsequently, the CPU 11 determines at Step 130 whether the connection for the handsfree profile is successful, that is, whether the handset 21 is multi-profile compatible, according to whether the HFP connection response signal from the handset 21 includes a message of "OK" or "NG." If the connection is successful, the CPU 11 subsequently executes Step 135. If the connection is not successful, the CPU 11 subsequently executes Step 150.

At Step 135, the CPU 11 executes the program 200 and other programs for the handsfree profiles. Thus, (i) data communications by using the dial-up network profile and (ii) receiving and displaying of the incoming phone call are provided at a time.

Subsequently at Step 140, the CPU 11 determines whether the data communications are terminated. The CPU 11 executes the determination repeatedly until the determination becomes affirmative. The termination of the data communications can be detected, for example, when the manual operating device 3 receives a user's operation to terminate the data communications.

If the determination is affirmative, the CPU 11 subsequently executes at Step 145 a process for cutting off the connection for the dial-up network profile. Specifically, the CPU 11 transmits, by using the Bluetooth device 6, a DUN disconnection request signal requesting for cutting off the connection for the dial-up network profile. Additionally, the CPU 11 terminates the execution of the program for the data communications, when it receives, through the Bluetooth device 6, a DUN disconnection response signal including a message of "OK" which is transmitted in response to the request signal by the handset 21. At this stage, the connection for the handsfree profile alone is maintained. After Step 140, the CPU 11 ends the execution of the program 100 of this time.

At Step 150, the CPU 11 determines whether the data communications are terminated, as is done at Step 140. The CPU 11 executes the determination repeatedly until the determination becomes affirmative. If the determination is affirmative, the CPU 11 executes at Step 155 a process for cutting off the connection for the dial-up network profile, as is done at Step 145.

At this time, neither of the connection for the handsfree profile and the connection for the dial-up network profile is maintained.

Subsequently at Step 160, the CPU 11 establishes a connection for the handsfree profile. Specifically, the CPU 11 transmits, by using the Bluetooth device 6, another HFP connection request signal requesting for a connection for the handsfree profile. Additionally, the CPU 11 waits for the HFP connection response including a message of "OK" which is transmitted in response to the HFP connection request signal. When the CPU 11 receives the HFP connection response including a message of "OK," it subsequently executes the program 200 and other programs for the handsfree profiles. After Step 160, the CPU 11 ends the execution of the program 100 of this time.

Figure 4:
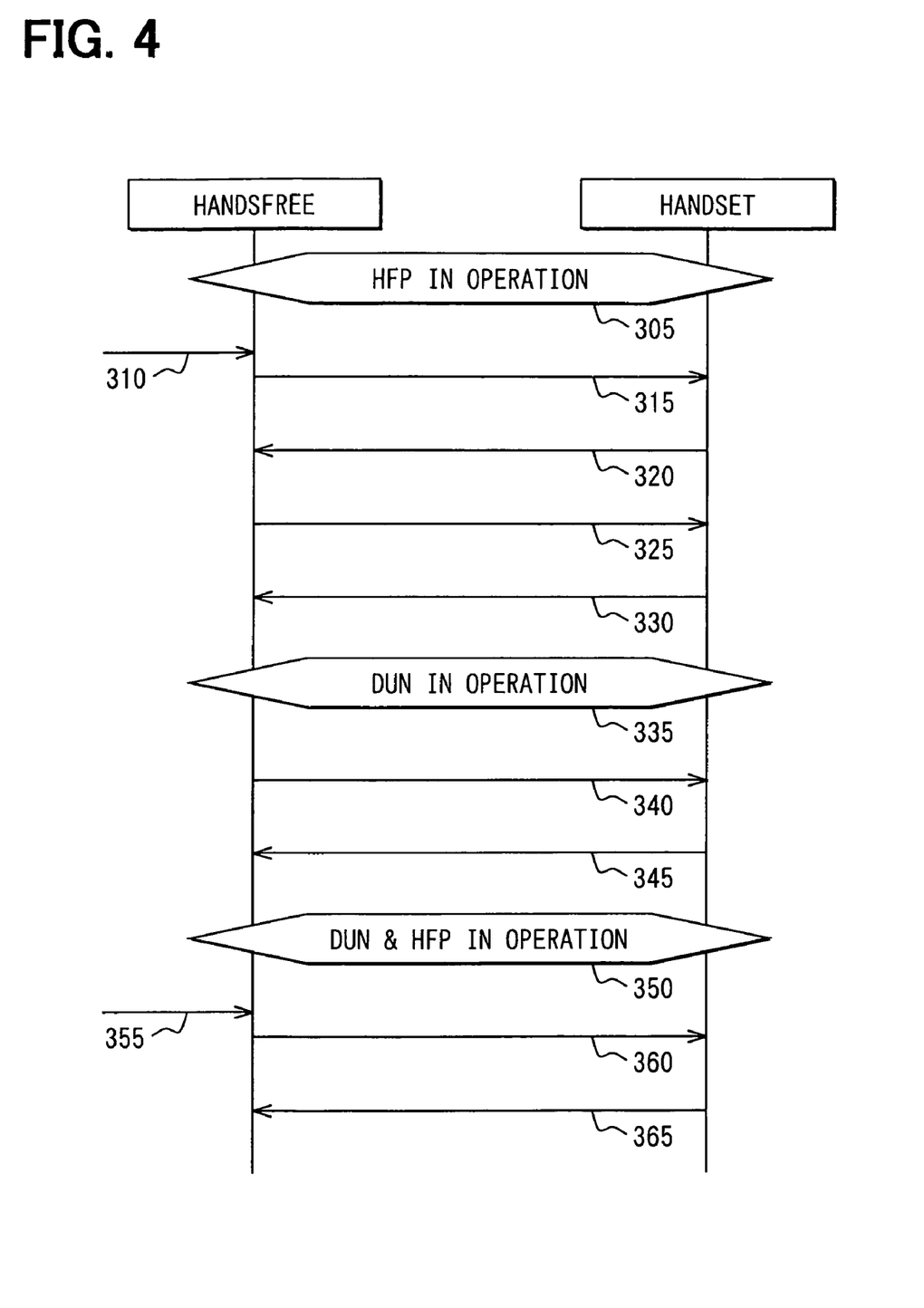
FIG. 4 is a sequence chart illustrating a procedure of communications between the handsfree device and a multi-profile compatible mobile phone handset.
Figure 5:
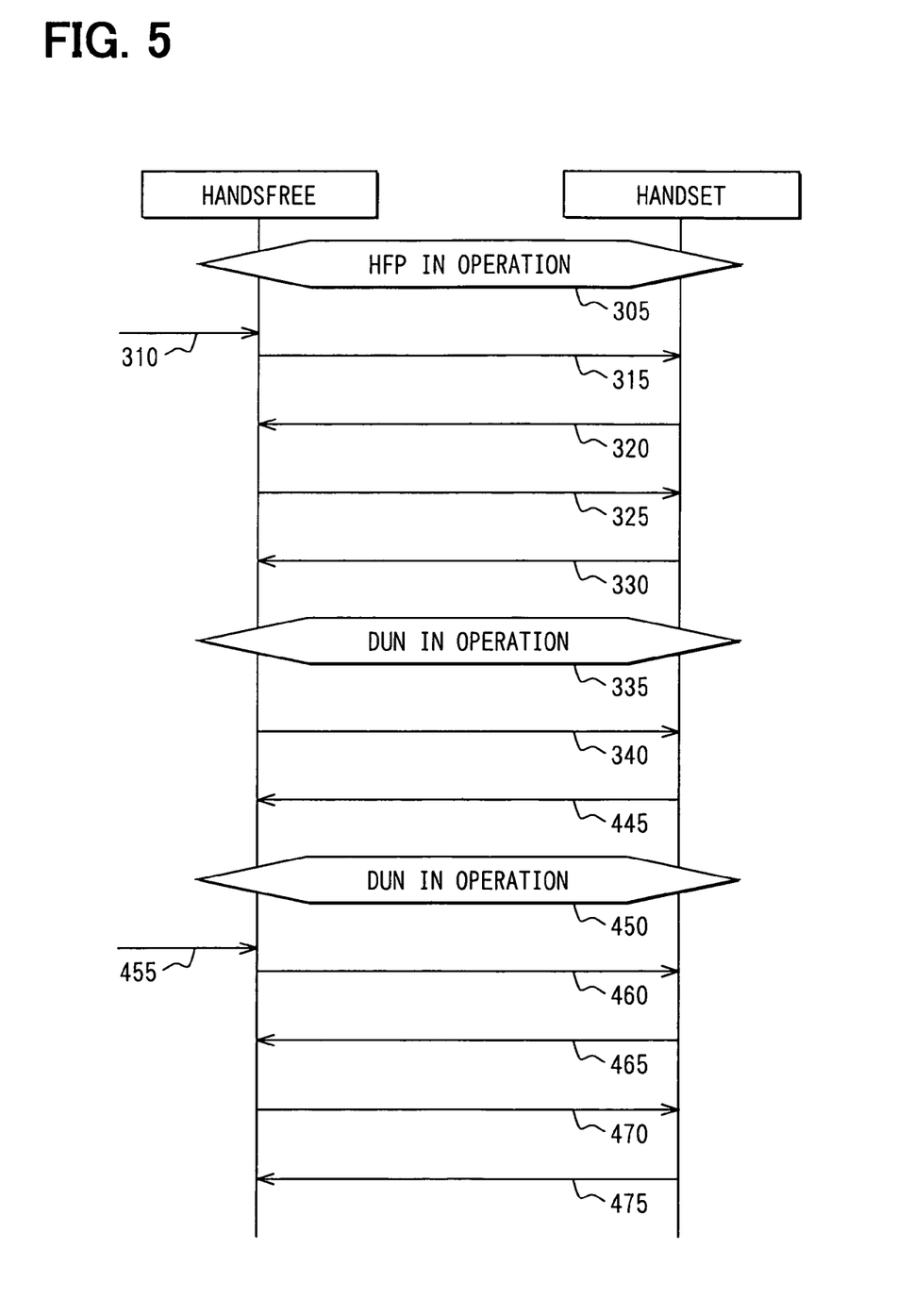
FIG. 5 is a sequence chart illustrating a procedure of communications between the handsfree device and a multi-profile incompatible mobile phone handset.

Hereafter, the operation of the handsfree device 1 is described with respect to the sequence charts in FIG. 4 and FIG. 5. In FIG. 4, the handsfree device 1 communicates with the handset 21 that is eventually determined to be multi-profile compatible, while in FIG. 5, the handsfree device 1 communicates with the handset 21 that is eventually determined to be multi-profile incompatible (i.e., to be not multi-profile compatible).

In FIG. 4, at an initial state, the handsfree device 1 and the handset 21 establish a connection for the handsfree profile between each other (State 305). Next, a user gives an operation 310 to the manual operating device 3 for initiating the data communications. The handsfree device 1 thereby determines at Step 105 of the program 100 that the manual operating device 3 received the operation for the data communications, subsequently transmitting at Step 110 the HFP disconnection request signal 315. Then, the handset 21 transmits, in response to the request signal 315, the HFP disconnection response signal 320 including the message of "OK" to the handsfree device 1.

Then the handsfree device 1 finishes at Step 110 the process for cutting off the connection for the handsfree profile, based on the reception of the response signal 320. Subsequently the handsfree device 1 transmits at Step 115 the DUN connection request signal 325 to the handset 21. Then the handset 21 transmits, in response to the request signal 325, the DUN connection response signal 330 including the message of "OK" to the handsfree device 1. Thus, a connection for the dial-up network profile is established. Subsequently, the handsfree device 1 achieves the data communications using the handset 21 by executing the process for the data communications at Step 120. Thus, the handsfree device 1 and the handset 21 transit to State 335.

Subsequently, the handsfree device 1 transmits at Step 125 the HFP connection request signal 340 to the handset 21. Then, the handset 21 being multi-profile compatible transmits, in response to the request signal 340, the HFP connection response signal 345 including the message of "OK" to the handsfree device 1.

Based on the reception of the response signal 345 including the message of "OK," the handsfree device 1 determines at Step 130 that the connection for the handsfree profile is successful and subsequently stands by for an incoming phone call. At this state, the handsfree device 1 and the handset 21 is in State 350 where both functions for the handsfree profile and the dial-up network profile are in operation.

Thereafter, by an event 355 of indicating termination of the data communications, the handsfree device 1 determines at Step 140 that the data communications are terminated. Subsequently the handsfree device 1 transmits at Step 145 the DUN disconnection request signal 360 to the handset 21. Then, in response to the request signal 360, the handset 21 transmits the DUN disconnection response signal 365 including the message of "OK" to the handsfree device 1. Thus, the handsfree device 1 and the handset 21 transit to a state where the connection for the handsfree profile is solely maintained between them.

Next, the handsfree device 1 communicates with the handset 21 that is eventually determined to be multi-profile incompatible, which will be explained with reference to FIG. 5. The sequence from an initial state (State 305) to State 335 in FIG. 5 is the same as that in FIG. 4. Thus, after the handsfree device 1 and the handset 21 transit to State 335, the handsfree device 1 transmits at Step 125 the HFP connection request signal 340 to the handset 21.

In this case, the handset 21 being multi-profile incompatible transmits, in response to the request signal 340, the HFP connection response signal 445 including the message of "NG" to the handsfree device 1, instead of including the message of "OK" in FIG. 4.

Based on the reception of the response signal 445 including the message of "NG," the handsfree device 1 determines at Step 130 that the connection for the handsfree profile is unsuccessful and subsequently waits at Step 150 for the termination of the data communications. At this stage, the function for the dial-up network profile is solely in operation. The stage corresponds to a state 450.

Thereafter, by an event 455 of indicating termination of the data communications, the handsfree device 1 determines at Step 150 that the data communications are terminated. Subsequently the handsfree device 1 transmits at Step 155 the DUN disconnection request signal 460 to the handset 21. Then the handset 21 transmits, in response to the request signal 460, the DUN disconnection response signal 465 including the message of "OK" to the handsfree device 1. Thus, the handsfree device 1 and the handset 21 transit to a state where the connection for neither the handsfree profile nor the dial-up network profile is maintained between them.

Subsequently, the handsfree device 1 transmits at Step 160 the HFP connection request signal 470 requesting for a connection for the handsfree profile to the handset 21. Then, the handset 21 transmits, in response to the request signal 470, the HFP connection response signal 475 including the message of "OK" to the handsfree device 1. Subsequently, the handsfree device 1 and the handset 21 transit to a state where the function for the handsfree profile is in operation.

Thus, in this embodiment, a handsfree device 1 being multi-profile compatible communicates with a handset 21 whose multi-profile compatibility is unknown at an initial state as follows: At the initial state, the handsfree device 1 is maintaining a connection for the handsfree profile with the handset 21. Thereafter, a user gives an operation for initiating the data communications (see Step 105). Based on the user's operation, the handsfree device 1 cuts off (see Step 110) the connection for the handsfree profile before trying to establish a connection for the dial-up network profile. After cutting off the connection for the handsfree profile, the handsfree device 1 then establishes (see Step 115) the connection for the dial-up network profile. The handsfree device 1 subsequently transmits (see Step 125) the request for a connection for the handsfree profile while maintaining the connection for the dial-up network profile. Subsequently, the handsfree device 1 determines (see Step 130) whether the handset 21 is multi-profile compatible according to the response to the request from the handset 21.

Based on the determination that the handset 21 is multi-profile compatible, the handsfree device 1 executes (see Step 135) the processes for the handsfree profile while maintaining the connection or processes for the dial-up network profile. In contrast, based on the determination that the handset 21 is multi-profile incompatible, the handsfree device 1 stops trying to establish a connection for the handsfree profile till the termination (see Step 155) of the connection for the dial-up network profile. After the termination of the connection for the dial-up network profile, the handsfree device 1 establishes (see Step 160) the new connection for the handsfree profile.

Thus, the handsfree device 1 transmits the request for the connection for the handsfree profile while maintaining the connection for the dial-up network profile with the handset 21. Therefore, if the handset 21 is multi-profile compatible, the handsfree device 1 receives the response indicating that the connection for the handsfree profile is permitted. On the other hand, if the handset 21 is multi-profile incompatible, the handsfree device 1 receives the response indicating that the connection for the handsfree profile is denied.

The handsfree device 1 determines whether the handset 21 is multi-profile compatible based on the response. Then the handsfree device 1 executes the processes for the handsfree profile while maintaining the connection for the dial-up network profile if the handset 21 is multi-profile compatible.

Thus, the handsfree device 1 establishes the connections by utilizing the multi-profile compatibility only when the handset 21 is multi-profile compatible. Therefore, the handsfree device 1 utilizes the multi-profile compatibility of the multi-profile compatible handset and does not cause problems in establishing a connection with the multi-profile incompatible handset.

In addition, the handsfree device 1 initiates the function for the dial-up network profile requested by the user's operation, after cutting off the connection for the handsfree profile. Therefore, irrespective of whether or not the handset 21 is multi-profile compatible, the handsfree device 1 preferentially provides a function for a profile requested by the user, by cutting off the currently existing connection for another profile. Subsequently, if the handset 21 is multi-profile compatible, the handsfree device 1 provides at a time the functions for both the requested profile and the profile having been cut off.

Moreover, the handsfree device 1 establishes the connection for the handsfree profile after the termination of the connection for the dial-up network profile, based on the determination that the handset 21 is multi-profile incompatible. Therefore, the handsfree device 1 automatically establishes again the connection for the handsfree profile, which was previously cut off, automatically after the termination of the connection for the dial-up network profile.

Second Embodiment

Figure 6:
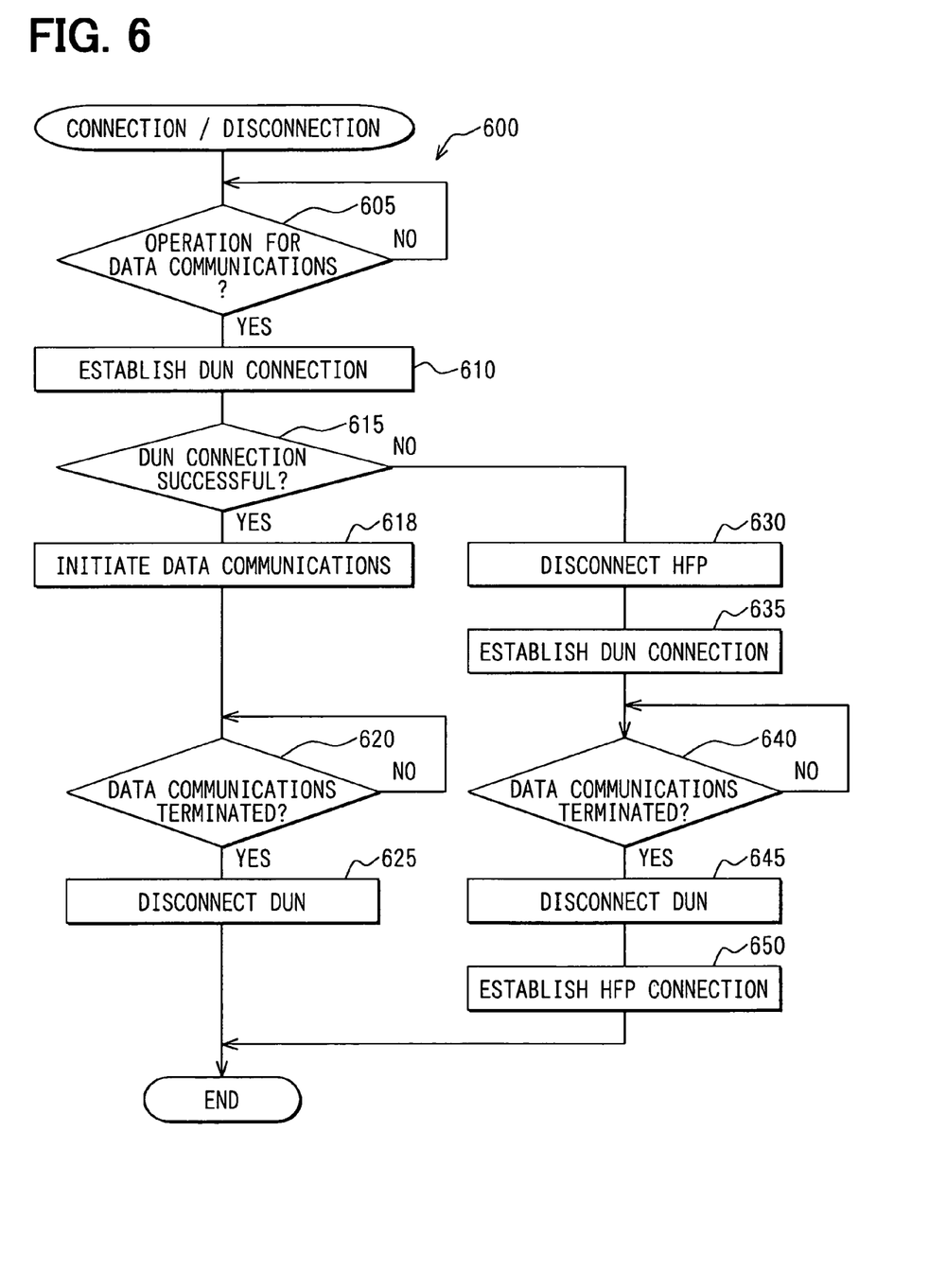
FIG. 6 is a flowchart illustrating a connection/disconnection program of the second embodiment.

The handsfree device 1 of a second embodiment differs from that of the first embodiment in the following: the CPU 11 of the second embodiment executes repeatedly a connection/disconnection program 600 in FIG. 6 in place of the connection/disconnection program 100 while the CPU 11 is executing the processes for the handsfree profile.

In executing the program 600, the CPU 11 initially determines at Step 605 whether the manual operating device 3 receives the user's operation for initiating the data communications. The CPU 11 executes the determination repeatedly until the determination becomes affirmative.

When the determination is affirmative, the CPU 11 then executes trying to establish a connection for the dial-up network profile at Step 610. Specifically, the CPU 11 transmits the DUN connection request signal by using the Bluetooth device 6.

Subsequently the handsfree device 1 determines at Step 615 whether the connection for the dial-up network profile is successful, that is, whether the handset 21 is multi-profile compatible. If the connection is successful, the CPU 11 subsequently executes Step 618. If the connection is not successful, the CPU 11 subsequently executes Step 630. The handsfree device 1 determines that the connection is successful when the HFP connection response signal from the handset 21 includes the message of "OK." In contrast, the handsfree device 1 determines that the connection is unsuccessful when the HFP connection response signal from the handset 21 includes the message of "NG."

In addition, the handsfree device 1 may determine that the connection is unsuccessful when it does not receive a response to the DUN connection request signal for a reference period after the transmission of the request signal. The reference period may be (i) a constant value stored beforehand, (ii) a value determined depending on various conditions such as an intensity level of a received wireless signal at the handset 21, or (iii) a value determined randomly within a predetermined range.

The processes at Steps 618, 620, and 625 are the same as the processes at Steps 120, 140, and 145 in the program 100, respectively. Thus, after the establishment of the connection for the dial-up network profile, the functions for both the dial-up network profile and the handsfree profile are in operation at a time.

At Step 630, the CPU 11 executes a process for cutting off the connection for the handsfree profile, as is done at Step 110 in the program 100. Subsequently, the CPU 11 establishes at Step 635 a connection for the dial-up network profile, as is done at Step 115 in the program 100. Thus, the function for the dial-up network profile is solely provided.

Processes at following Steps 640, 645, and 650 are the same as the processes at Steps 150, 155, and 160 in the program 100, respectively.

Thus, in the second embodiment, a handsfree device 1 being multi-profile compatible communicates with a handset 21 whose multi-profile compatibility is unknown at an initial state as follows: At the initial state, the handsfree device 1 is maintaining a connection for the handsfree profile with handset 21. Thereafter, a user gives an operation for initiating the data communications (see Step 605). Based on the user's operation, establishing a connection for the dial-up network profile is attempted (see Steps 610, 615) without cutting off the connection for the handsfree profile. Then the handsfree device 1 cuts off (see Step 630) the connection for the handsfree profile triggered only by the failure of the attempt, and subsequently provides (see Step 635) the functions for the dial-up network profile.

Thus, the handsfree device 1 makes the attempt to initiate the function for the profile requested by the user's operation, by transmitting the request for the connection for the requested profile to the handset 21. Then the handsfree device 1 terminates the currently existing connection for another profile only after the failure of the attempt.

Other Embodiments

The present invention should not be limited to the embodiments discussed above and shown in the figures, but may be implemented in various ways without departing from the spirit of the invention.

For example, the handsfree device 1 and the handset 21 may be replaced with another Bluetooth communicator.

Moreover, the handsfree device 1 and the handset 21 may be replaced with another short-range wireless communicator. In this case, the profiles can be replaced with kinds of functions implemented in the short-range wireless communicator. In addition, the multi-profile compatible handset 21 can be replaced with a multi-function compatible wireless short-range communicator, which is capable of providing connections for the different kinds of functions at a time.

In addition, the handsfree profile and the dial-up network profile may be replaced with any other profiles defined by the Bluetooth, such as an interoperability profile, as long as the profiles are different from each other. A file transfer profile (FTP), a headset profile (HSP), a human interface profile (HIP), an LAN access profile (LAP), an object push profile (OPP), and a personal networking profile (PAN) are implementations of the interoperability profile.

In the first embodiment, the handsfree device 1 does not always have to determine whether the handset 21 is multi-profile compatible, as long as the CPU 11 transmits an HFP connection request signal requesting for a connection for the handsfree profile before the determination. For example, in executing the program 100, the CPU 11 may execute Step 150 immediately after Step 125. In this case, the program 200 should be under execution after the transmission of the request.

In this case, if the handset 21 is multi-profile compatible, it provides the functions for the dial-up network profile and the handsfree profile at a time and executes the notification of an incoming phone call to the handsfree device, irrespective of whether the handsfree device 1 makes the determination or not. Therefore, the handsfree device 1, which is executing the program 200 after the transmission of the request, executes the process based on the received notification while maintaining the connection for the dial-up network profile.

In contrast, if the handset 21 is multi-profile incompatible, the handset 21 continues the function for the dial-up network profile even when it receives the HFP connection request signal. Therefore, the handset 21 does not transmit the notification of an incoming phone call.

Moreover, the handsfree device 1 transmits the HFP connection request signal on the termination of the connection for the dial-up network profile, irrespective of whether or not the handset 21 is multi-profile compatible. Then the multi-profile compatible handset 21, which has already initiated the operation for the handsfree profile, ignores the request signal and continues the operation. In contrast, the multi-profile incompatible handset 21 initiates the operation for the handsfree profile on receiving the request. Therefore, in both cases, the function for the handsfree profile is in operation after the termination of the connection for the dial-up network profile.

Thus, the handsfree device 1 establishes the connections with the handset 21 by utilizing the multi-profile compatibility only when the handset 21 is multi-profile compatible. Therefore, the handsfree device 1 utilizes the multi-profile compatibility of the multi-profile compatible handset and does not cause problems in establishing a connection with the multi-profile incompatible handset.

In addition, The CPU 11 may be replaced with another devices dedicated for the functions which the CPU 11 provides by executing the above programs.

A process may be executed using a CPU, a ROM, and the like. Here, steps in the process may be constructed as means or units in program stored in the ROM or the like.

It will be obvious to those skilled in the art that various changes may be made in the above-described embodiments of the present invention. However, the scope of the present invention should be determined by the following claims.

What is claimed is:

1. A Bluetooth communicator, comprising:
    a connection request transmission means for transmitting a request to another Bluetooth communicator, while maintaining a connection for a first profile with the another Bluetooth communicator, the request being for a connection for a second profile different from the first profile;
    a determination means for determining whether the another Bluetooth communicator is multi-profile compatible, according to a response from the another Bluetooth communicator; and
    a multi-profile processing means for executing a process for the second profile while maintaining the connection for the first profile, based on the determination that the another Bluetooth communicator is multi-profile compatible;
    a disconnection means for disconnecting, triggered by a user's operation, a preceding connection for the second profile;
    a connection means for establishing the connection for the first profile with the another Bluetooth communicator after the disconnection by the disconnection means,
    wherein the connection request transmission means transmits the request while maintaining the connection for the first profile, after the establishment of the connection for the first profile by the connection means.

2. The Bluetooth communicator according to claim 1, further comprising:
    a reconnection means for establishing, after the connection for the first profile is disconnected, another connection for the second profile with the another Bluetooth communicator, based on the determination that the another Bluetooth communicator is multi-profile incompatible.

3. The Bluetooth communicator according claim 1, wherein the first profile is a dial-up network profile and the second profile is a handsfree profile.

4. A Bluetooth communicator, comprising:
    a connection request transmission means for transmitting a request to another Bluetooth communicator, while maintaining a connection for a first profile with the another Bluetooth communicator, the request being for a connection for a second profile different from the first profile;
    a determination means for determining whether the another Bluetooth communicator is multi-profile compatible, according to a response from the another Bluetooth communicator; and
    a multi-profile processing means for executing a process for the second profile while maintaining the connection for the first profile, based on the determination that the another Bluetooth communicator is multi-profile compatible,
    wherein the connection request transmission means transmits the request to the another Bluetooth communicator with maintaining the connection for the first profile, based on receiving another request for the connection for the second profile while the connection for the first profile is available, and
    the Bluetooth communicator further comprising:
    a disconnection means for disconnecting the connection for the first profile based on the determination that the another Bluetooth communicator is multi-profile incompatible; and
    a single-profile processing means for executing a process for the second profile based on the disconnection of the connection for the first profile by the disconnection means.

5. The Bluetooth communicator according to claim 4, wherein
    when the executing of the process for the second profile by the single-profile processing means is determined to be terminated, a connection for the first profile is then automatically established.

6. A short-range wireless communicator, comprising:
    a connection request transmission means for transmitting a request to another short-range wireless communicator, while maintaining a connection for a first function with the another short-range wireless communicator, the request being for a connection for a second function different from the first function;
    a determination means for determining whether the another short-range wireless communicator is multi-function compatible, according to a response to the request from the another short-range wireless communicator;
    a multi-function processing means for executing a process for providing the second function while maintaining the connection for the first function, based on the determination that the another short-range wireless communicator is multi-function compatible;
    a disconnection means for disconnecting, triggered by a user's operation, a preceding connection for the second function; and
    a connection means for establishing the connection for the first function with the another short-range wireless communicator after the disconnection by the disconnection means,
    wherein the connection request transmission means transmits the request while maintaining the connection for the first function, after the establishment of the connection for the first function by the connection means.

7. The short-range wireless communicator according to claim 6, further comprising
    a reconnection means for establishing, after the connection for the first function is disconnected, another connection for the second function with the another short-range wireless communicator, based on the determination that the another short-range wireless communicator is multi-function incompatible.

8. The short-range wireless communicator according to claim 6, wherein the first function is a dial-up network function and the second function is a handsfree function.

9. A short-range wireless communicator comprising:
- a connection request transmission means for transmitting a request to another short-range wireless communicator, while maintaining a connection for a first function with the another short-range wireless communicator, the request being for a connection for a second function different from the first function;
- a determination means for determining whether the another short-range wireless communicator is multi-function compatible, according to a response to the request from the another short-range wireless communicator;
- a multi-function processing means for executing a process for providing the second function while maintaining the connection for the first function, based on the determination that the another short-range wireless communicator is multi-function compatible,
- wherein the connection request transmission means transmits the request to the another short-range wireless communicator while maintaining the connection for the first function, based on receiving another request for the connection for the second function while the connection for the first function is available, and
- the short-range wireless communicator further comprising:
- a disconnection means for disconnecting the connection for the first function based on the determination that the another short-range wireless communicator is multi-function incompatible; and
- a single-function processing means for executing a process for providing the second function based on the disconnection of the connection for the first function by the disconnection means.

10. The short-range wireless communicator according to claim 9, wherein when the executing of the process for providing the second function by the single-function processing means is determined to be terminated, a connection for the first function is then automatically established.

11. An in-vehicle Bluetooth communication device comprising:
- a connection request transmission means for transmitting a request to a cellular phone Bluetooth communicator provided in a cellular phone, while maintaining a connection for a first profile with the cellular phone Bluetooth communicator, the request being for a connection for a second profile different from the first profile;
- a determination means for determining whether the cellular phone Bluetooth communicator is multi-profile compatible, according to a response from the cellular phone Bluetooth communicator;
- a multi-profile processing means for executing a process for the second profile while maintaining the connection for the first profile, based on the determination that the cellular phone Bluetooth communicator is multi-profile compatible;
- a memory configured to store a telephone number and a name associated with the telephone number; and
- a display configured to display the name associated with the telephone number when an incoming call reaches the cellular phone,
- wherein when the display operates to display the name, the multi-profile processing means executes the process for the second profile while maintaining the connection for the first profile,
- wherein the telephone number is received at the display from the cellular phone Bluetooth communicator using the first profile, and
- wherein the first profile is a handsfree profile.

* * * * *